United States Patent
Allidieres (10) Patent No.: US 11,761,585 B2
(45) Date of Patent: Sep. 19, 2023

(54) DEVICE AND METHOD FOR FILLING PRESSURIZED GAS TANKS

(71) Applicant: L'Air Liquide, Societe Anonyme pour l'Etude et l'Exploitation des Procedes Georges Claude, Paris (FR)

(72) Inventor: Laurent Allidieres, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/880,387

(22) Filed: Aug. 3, 2022

(65) Prior Publication Data
US 2022/0373135 A1 Nov. 24, 2022

Related U.S. Application Data

(63) Continuation of application No. 17/227,162, filed on Apr. 9, 2021, now abandoned.

(51) Int. Cl.
F17C 5/06 (2006.01)

(52) U.S. Cl.
CPC .......... *F17C 5/06* (2013.01); *F17C 2221/012* (2013.01); *F17C 2223/0123* (2013.01);
(Continued)

(58) Field of Classification Search
CPC ................. F17C 5/06; F17C 2221/012; F17C 2223/0123; F17C 2225/0123; F17C 2227/0157; F17C 2250/032; F17C 2250/0689; F17C 2201/0109; F17C 2201/054; F17C 2205/0142; F17C 2205/0146; F17C 2205/0326;
(Continued)

(56) References Cited

U.S. PATENT DOCUMENTS 5,699,839 A 12/1997 Dehne
8,418,732 B2 4/2013 Cohen
(Continued)

FOREIGN PATENT DOCUMENTS

EP 3 409 998 12/2018

OTHER PUBLICATIONS

French Search Report for FR 2 003 616, dated Dec. 3, 2020.

*Primary Examiner* — Timothy P. Kelly
*Assistant Examiner* — Stephanie A Shrieves
(74) *Attorney, Agent, or Firm* — Christopher J. Cronin; Elwood L. Haynes (57) ABSTRACT

Device and method for filling pressurized gas tanks, comprising a fluid transfer circuit comprising an upstream end provided with a plurality of pressurized fluid sources and a downstream end comprising at least two distribution terminals each intended to be connected to separate tanks to be filled, each source comprising a first fluid outlet connected to a first respective outlet valve, each first outlet valve being connected to each of the at least two distribution terminals via parallel transfer ducts, each of the transfer ducts comprising at least one respective isolation valve, each of the distribution terminals being fluidly connected to each first outlet valve of a source via a first direct fluid path passing through a single transfer duct and via at least one second indirect alternative fluid path successively passing through a plurality of transfer ducts.

13 Claims, 5 Drawing Sheets

(52) U.S. Cl.
CPC ............... *F17C 2225/0123* (2013.01); *F17C 2227/0157* (2013.01); *F17C 2250/032* (2013.01); *F17C 2250/0689* (2013.01); *F17C 2265/065* (2013.01)

(58) Field of Classification Search
CPC ........ F17C 2223/0161; F17C 2223/036; F17C 2225/036; F17C 2227/043; F17C 2250/034; F17C 2270/0168; F17C 2270/0184; F17C 13/04; F17C 2227/0135; F17C 5/007; F17C 13/02; F17C 2270/0139; Y02E 60/32
USPC ........................................................ 141/21
See application file for complete search history.

(56) References Cited

U.S. PATENT DOCUMENTS

| | | | |
|---|---|---|---|
| 9,353,912 B2 | 5/2016 | Kennett et al. | |
| 10,240,721 B2* | 3/2019 | Dawson | F17C 5/06 |
| 2009/0236006 A1 | 9/2009 | Farese et al. | |
| 2014/0263420 A1 | 9/2014 | Lambrix et al. | |
| 2014/0352840 A1 | 12/2014 | Blanchet | |
| 2015/0240996 A1 | 8/2015 | Kapoor | |
| 2017/0023180 A1 | 1/2017 | Petit et al. | |
| 2017/0045182 A1* | 2/2017 | Poorman | F17C 5/06 |
| 2017/0102110 A1 | 4/2017 | Lomax et al. | |
| 2018/0347761 A1 | 12/2018 | Lacombe et al. | |
| 2019/0178447 A1 | 6/2019 | Poorman et al. | |
| 2021/0003253 A1* | 1/2021 | Thieu | F17C 13/025 |
| 2021/0317951 A1* | 10/2021 | Werlen | F17C 5/007 |

* cited by examiner

DEVICE AND METHOD FOR FILLING PRESSURIZED GAS TANKS

CROSS-REFERENCE TO RELATED APPLICATIONS

The present application is a continuation application of U.S. application Ser. No. 17/227,162 filed Apr. 9, 2021, which claims the benefit of priority under 35 U.S.C. § 119 (a) and (b) to French patent application No. FR 2003616, filed Apr. 10, 2020, the entire contents of which are incorporated herein by reference.

BACKGROUND

Field of the Invention

The invention relates to a device and to a method for filling pressurized gas tanks.

More specifically, the invention relates to a device for filling pressurized gas tanks, in particular hydrogen tanks for vehicles, comprising a fluid transfer circuit comprising an upstream end provided with a plurality of pressurized fluid sources and a downstream end comprising at least two distribution terminals, each intended to be connected to separate tanks to be filled, each source comprising a first fluid outlet connected to a first respective outlet valve, each first outlet valve being connected to each of the at least two distribution terminals via parallel transfer ducts, each of the transfer ducts comprising at least one respective isolation valve.

Related Art

Hydrogen stations allow the tanks on board fuel cell vehicles to be filled quickly. These stations typically comprise a hydrogen source, a compressor (and/or a system for storing liquefied gas and for pumping and for vaporizing) that fills intermediate buffer tanks arranged in parallel. The filling operations are typically carried out by successive balancing actions between the buffer tanks of the station and the one or more tanks of the vehicle (optionally supplemented and/or completed and/or initiated by filling by the compressor). Therefore, filling also can be carried out by direct compression of the gas in the vehicle. In the case of high-capacity stations, it is then worthwhile adding one or more additional filling terminals, i.e. a plurality of filling ends provided with a nozzle ("dispenser") intended to be connected to the inlet of a tank to be filled.

In the event of a fault in any of the components of the station, one or more terminals may be rendered unusable. Indeed, for each addition of a terminal, in order to ensure independent gas distribution from one terminal to the next, as many valves need to be added as there are source buffer tanks. All the valves have a precise function in normal operation. In the event of a fault in a valve, all or part of the station is stopped.

SUMMARY OF THE INVENTION

An aim of the present invention is to overcome all or some of the aforementioned disadvantages of the prior art.

To this end, the device according to the invention, which also complies with the generic definition provided in the above preamble, is basically characterized in that each of the distribution terminals is fluidly connected to each first outlet valve of a source via a first direct fluid path passing through a single transfer duct and via at least one second alternative indirect fluid path successively passing through a plurality of transfer ducts.

The invention allows the reliability of stations with a plurality of terminals to be increased without adding specific equipment.

Furthermore, embodiments of the invention can comprise one or more of the following features:
- the plurality of pressurized fluid sources comprises a plurality of pressurized fluid containers;
- several of said pressurized fluid containers comprise a second fluid outlet connected to a second respective outlet valve;
- each of the second outlet valves of the fluid containers is connected to the distribution terminals via the transfer ducts;
- the plurality of pressurized fluid sources comprises at least one compressor;
- the outlet of the compressor is connected parallel to the second fluid outlets of the fluid containers and also to the transfer ducts;
- each distribution terminal comprises an isolation valve located downstream of the transfer ducts;
- the device comprises an electronic controller comprising a data storage and processing component, with at least some of the valves of the circuit being valves of the controlled type and connected to the electronic controller, the electronic controller being configured to control the opening or the closing of said valves;
- the electronic controller is configured to ensure a transfer of fluid between a source and a distribution terminal along the first direct fluid path passing through a single transfer duct or along the second indirect path successively passing through a plurality of transfer ducts according to the operating state of at least one of said valves.

The invention also relates to a method for filling a tank using a filling device according to any one of the above or following features, the method comprising a step of detecting a faulty valve in the circuit and a step of transferring fluid via an alternative path of the circuit that avoids said faulty valve.

According to other possible features:
- in the event of the detection of a fault in an isolation valve of a first transfer duct connected to a first distribution terminal, the method comprises a step of transferring fluid from a source to said first distribution terminal, passing via an indirect alternative path passing through transfer ducts connected to another distribution terminal, then via a second transfer duct connected to the first distribution terminal;
- the pressurized gas containers comprise a second fluid outlet connected to a second respective outlet valve, said second outlet valves of the fluid containers being connected to the distribution terminals via the parallel transfer ducts, the method comprising a step of transferring pressurized fluid from one of the pressurized fluid containers to a distribution terminal, and in the event of the detection of a fault in the first valve of the relevant container, the method comprises a step of transferring pressurized fluid from said fluid containers to the distribution terminal via the second fluid outlet;
- the plurality of pressurized fluid sources comprises at least one compressor connected parallel to the second fluid outlets of the fluid containers and to the transfer ducts, the method comprising a step of a fluid container being filled by the compressor, in the event of the detection of a fault in the first outlet valve of said container, the method comprising a step of filling said container via the second fluid outlet.

The invention can also relate to any alternative device or method comprising any combination of the features mentioned above or below within the scope of the claims.

BRIEF DESCRIPTION OF THE FIGURES

Further features and advantages will become apparent upon reading the following description, which is provided with reference to the figures, in which.

DETAILED DESCRIPTION OF THE INVENTION

Figure 1:
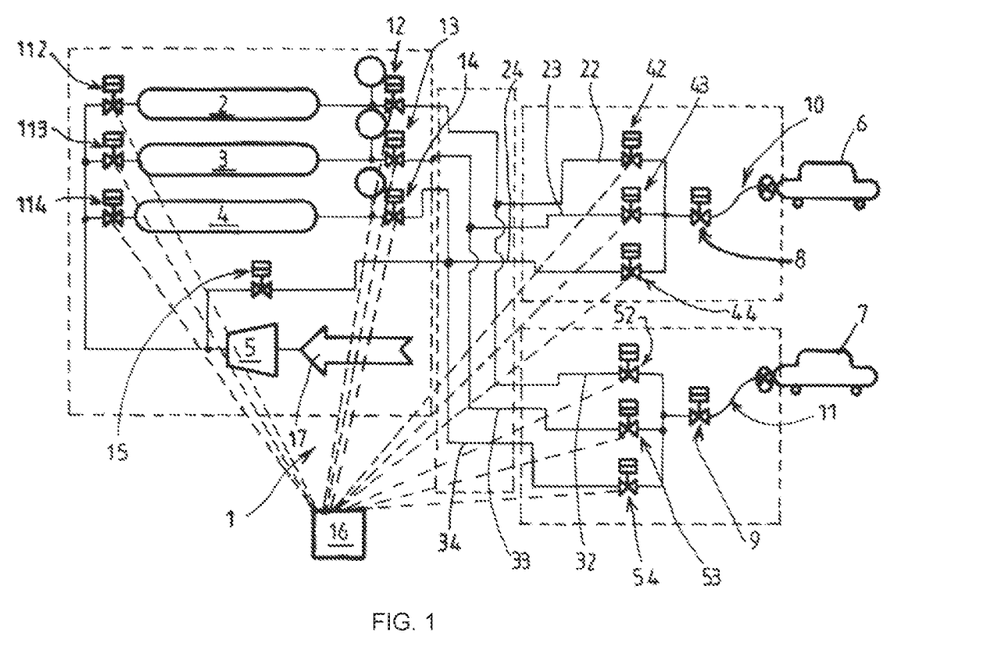
FIG. 1 is a schematic and partial view showing an example of the structure and operation of a filling device according to the invention.

The device 1 for filling pressurized gas tanks illustrated in FIG. 1 is, for example, a station 6, 7 for filling hydrogen tanks for vehicles.

The device 1 comprises a fluid transfer circuit comprising an upstream end provided with a plurality of pressurized fluid sources 2, 3, 4, 5 and a downstream end comprising at least two distribution terminals 10, 11 each intended to be connected to separate tanks 6, 7 to be filled.

In this non-limiting example, the device 1 comprises three pressurized gas buffer containers 2, 3, 4 and one compressor 5 (or pump). The compressor 5 can be fed with fluid (gas or respectively liquid) by a supply source 17 (network, electrolyser, liquefier, container, etc.).

Each source 2, 3, 4, 5 comprises a first fluid outlet connected to a first respective outlet valve 12, 13, 14, 15.

Each first outlet valve 12, 13, 14, 15 is connected to each of the at least two distribution terminals 10, 11 via respective parallel transfer ducts 22, 23, 24, 32, 33, 34. Thus, for example, a first valve 12 of a first source 2 is connected to the two terminals 10, 11 respectively via two separate and parallel transfer ducts 22, 32. The same is the case for the other sources 13, 14, 15.

Each of the transfer ducts 22, 23, 24, 32, 33, 34 preferably comprises at least one respective isolation valve 42, 43, 44, 52, 53, 54.

Preferably, each distribution terminal 10, 11 comprises an isolation valve 8, 9 located downstream of the transfer ducts 22, 23, 24, 32, 33, 34 (i.e. on the terminal portion 10, 11 where the transfer ducts 22, 23, 24 or 32, 33, 34 are connected).

Each distribution terminal 10, 11 is fluidly connected to each first outlet valve 12, 13, 14, 15 of the sources 2, 3, 4, 5 via, on the one hand, a first direct fluid path passing through a single transfer duct 22 or 23 or 24 or 32 or 33 or 34 and, on the other hand, via at least one second alternative indirect fluid path successively passing through a plurality of transfer ducts 22, 23, 24, 32, 33, 34. For example, the first direct fluid path passes through a single transfer duct directly connected to the relevant terminal.

Figure 2:
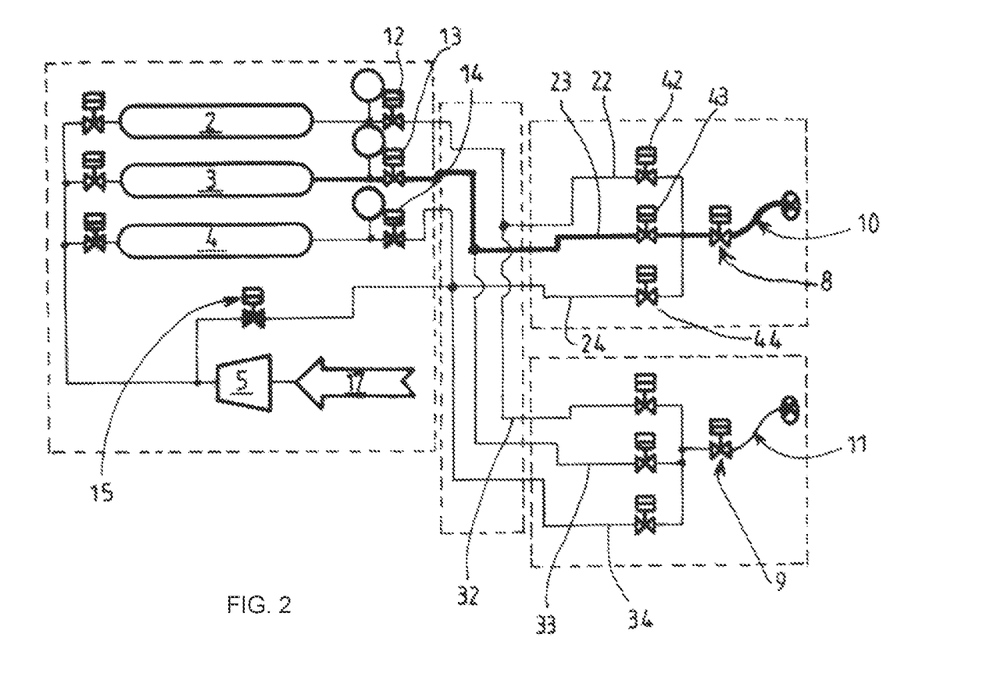
FIG. 2 shows the filling device in a first operating configuration.

FIG. 2 thus shows an example of a first operating configuration, called normal configuration, in which a buffer container 3 directly feeds a first terminal via the first valve 13 and the relevant transfer duct 23.

The second alternative indirect fluid path for its part successively passes through a plurality of transfer ducts, including at least one transfer duct directly connected to another terminal.

As described in further detail hereafter, this architecture allows valves to be used in order to fulfil the function of another faulty valve.

This means that, if a valve is faulty, the device 1 can be placed in or be arranged in a degraded filling mode by using the valves of another path of the circuit in order to compensate for the fault of the affected valve. Thus, for example, if a terminal is no longer available for filling, the station can still continue to be used to supply gas.

Figure 3:
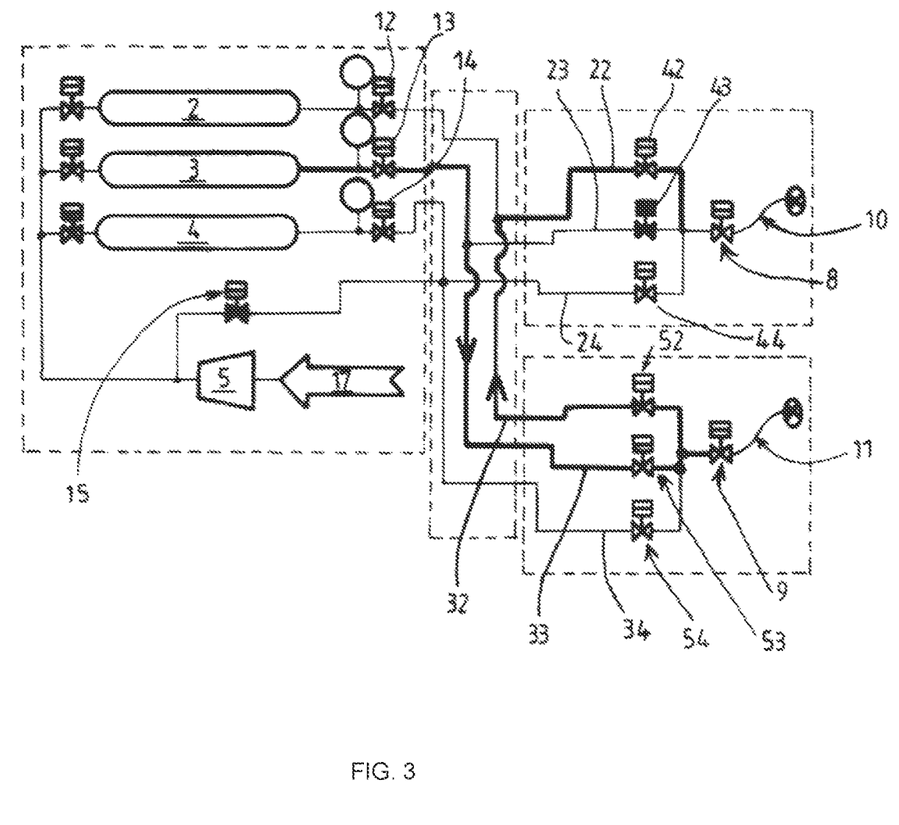
FIG. 3 shows the filling device in a second operating configuration.

FIG. 3 shows a first operating configuration, in which the isolation valve 43 used in the first configuration of FIG. 2 is broken down (shown in black). In this case, the second fluid path passes through a first transfer duct 33, then a second transfer duct 32 of the other terminal, in order to subsequently pass through another transfer duct 22 of the terminal 10 to be fed (opening corresponding isolation valves 52, 53, and 42).

As illustrated, the pressurized fluid containers 2, 3, 4 each preferably comprise a second fluid inlet/outlet connected to a second respective outlet valve 112, 113, 114. Each of the second outlet valves 112 113, 114 of the fluid containers 2, 3, 4 can be connected to the distribution terminals 10, 11 via at least the same transfer ducts 22, 23, 24, 32, 33, 34.

Similarly, the compressor outlet 5 can be connected to the first and second fluid outlets of the fluid containers 2, 3, 4 and also to at least one of the transfer ducts 22, 23, 24, 32, 33, 34 of each terminal 10, 11.

Figure 4:
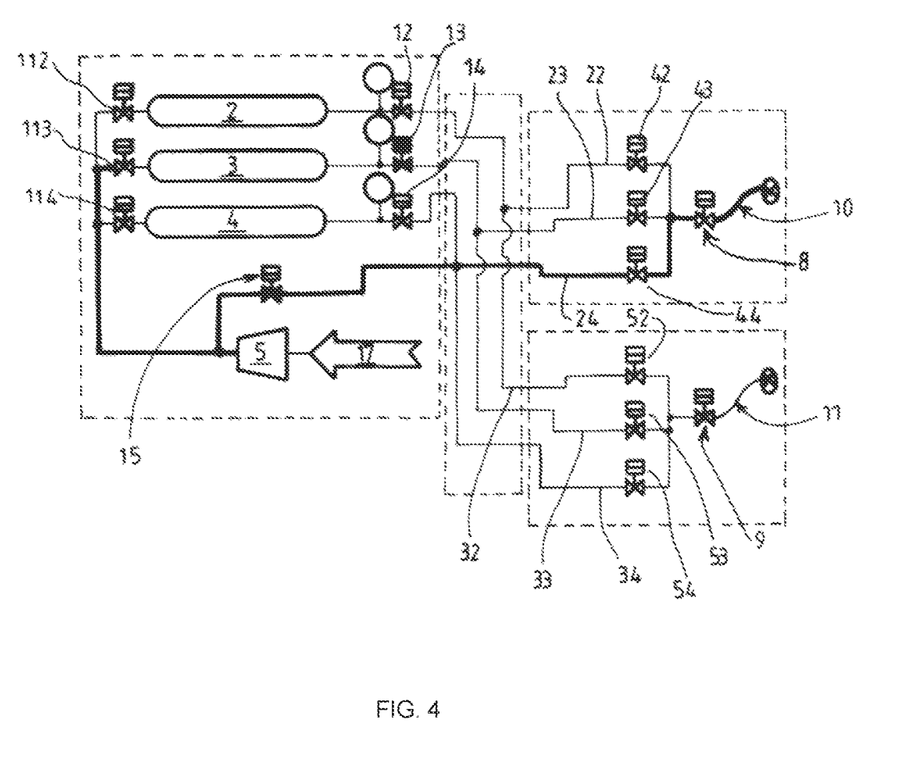
FIG. 4 shows the filling device in a third operating configuration.
Figure 5:
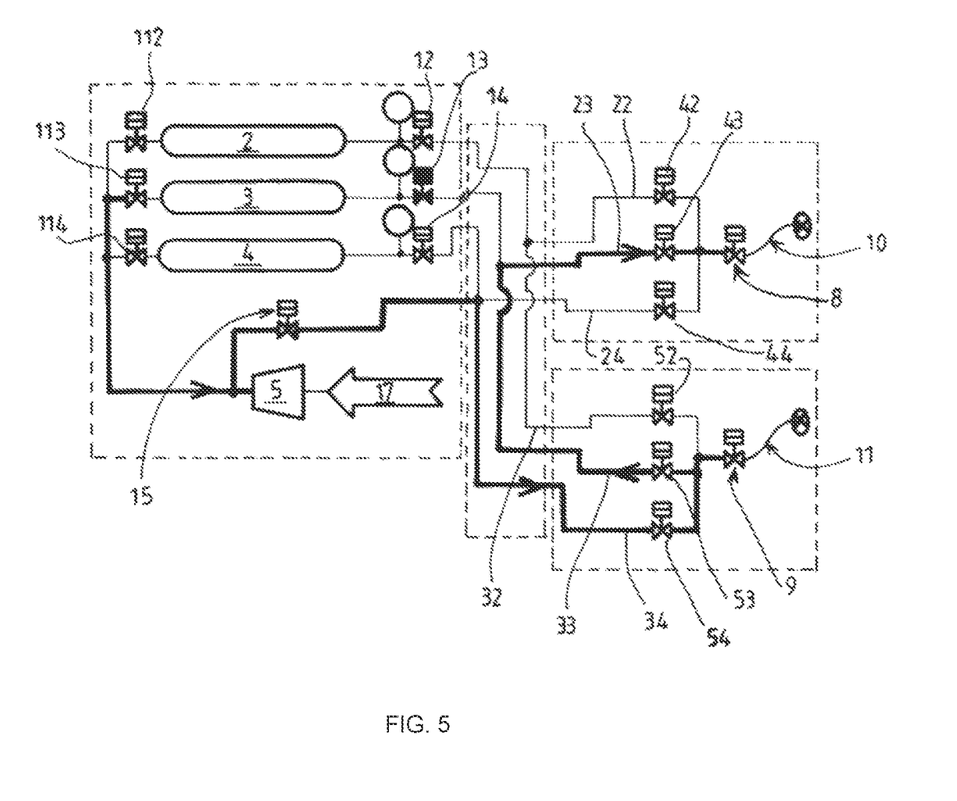
FIG. 5 shows the filling device in a fourth operating configuration.

As illustrated in FIG. 4 and in FIG. 5, if the first outlet valve 13 of a buffer container 3 is broken down (shown in black), the fluid transfer from said container 3 to a terminal 10 can be achieved by opening the second corresponding outlet valve 113 and via a direct path via a transfer duct 24 (FIG. 4) and/or via an indirect path via one of the second transfer ducts 33, 34 of the other terminal 11, then a transfer duct 23 of the considered terminal (FIG. 5).

Of course, the indirect path could pass through two transfer ducts 33, 34 of the other terminal 11, then one of the transfer ducts 23 of the considered terminal (FIG. 5).

Figure 6:
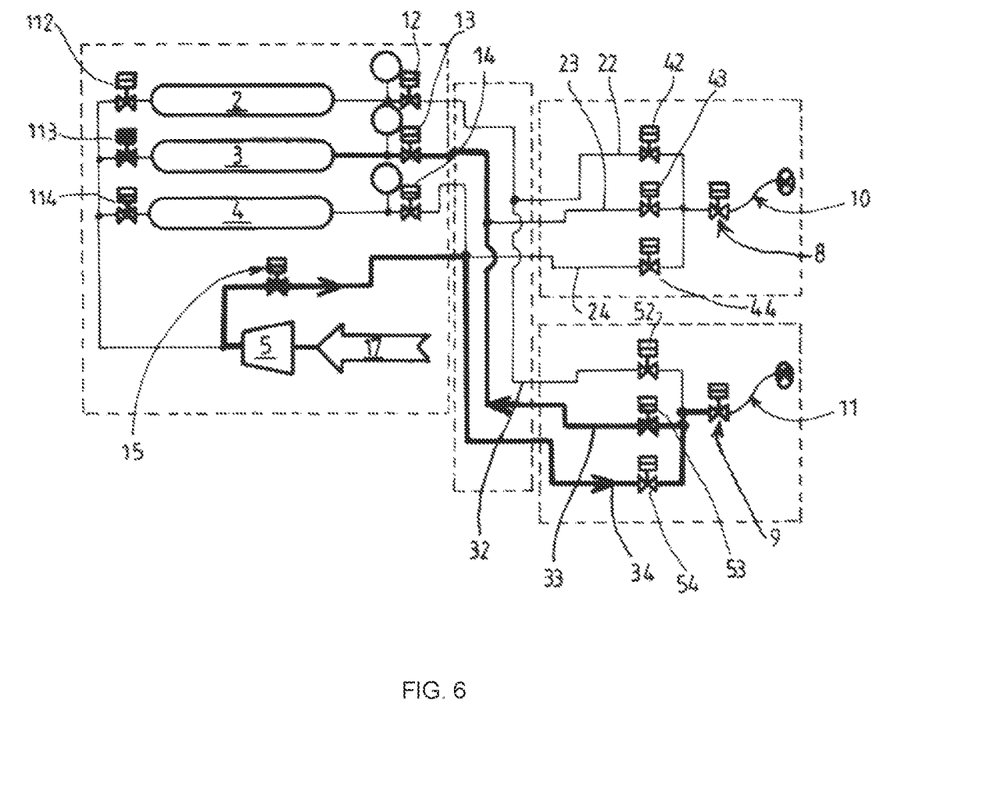
FIG. 6 shows the filling device in a fifth operating configuration.

If the second outlet valve 113 of a buffer container 3 is broken down (shown in black), said container 3 can be filled by the compressor 5 either directly by the first relevant fluid outlet (opening the first corresponding outlet valve 13) or, and as illustrated in FIG. 6, via an indirect path via two transfer ducts 34, 33 of another terminal 11. As an alternative embodiment, the indirect path could use two transfer ducts 34, 33 of the first terminal 10 (or another in the case of more than two terminals).

The examples described above show that, depending on which valves are faulty, at least one alternative path exists for completing the initially intended function. These alternative operating modes allow the station to be kept operational, even if a valve or terminal is temporarily out of service.

Thus, by virtue of this structure, even in the event of a fault in at least one valve, the arrangement (station) remains available at its nominal capacity, in particular for cascade filling operations from containers 2, 3, 4.

Throughout the above, first and second outlets have been designated for each pressurized fluid container. Of course, the term "outlet" must not be understood as only allowing fluid to be extracted from the container, but also that it allows it to be filled. However, preferably, in a normal configuration, the first outlet 12, 13, 14 can be preferred for extracting from the container, while the second outlet can be preferred for filling the container.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A device for filling pressurized gas tanks, comprising:
an electronic controller; and
a fluid transfer circuit comprising an upstream end provided with a plurality of pressurized fluid sources and a downstream end comprising at least two distribution terminals each intended to be connected to separate tanks to be filled, wherein:
each of said plurality of pressurized fluid sources comprises a first fluid outlet connected to a first respective outlet valve;
each first outlet valve being connected to each of the at least two distribution terminals via parallel transfer ducts;
each of the parallel transfer ducts comprising a respective at least one isolation valve;
each of the distribution terminals being fluidly connected to each first outlet valve of the plurality of pressurized fluid sources via a first direct fluid path passing through a single transfer duct and via at least one second indirect alternative fluid path successively passing through a plurality of transfer ducts;
the electronic controller comprises a data storage and processing component, with at least some of the valves of the circuit being control valves and connected to the electronic controller; and
the electronic controller is configured to:
control an opening or a closing of said first outlet valves and said at least one isolation valve and to ensure a transfer of fluid between one of the plurality of pressurized fluid sources and one of the distribution terminals along the first direct fluid path passing through a single transfer duct or along the second indirect path successively passing through a plurality of transfer ducts according to an operating state of at least one of said first outlet valves and said at least one isolation valve; and
upon detecting that one of the first outlet valves or one of said at least one isolation valve is at fault, opening or closing said first outlet valves and said at least one isolation valve to allow a transfer of fluid via at least one second indirect alternative fluid path of the circuit that avoids said detected faulty valve and thereby allow filling of a pressurized gas tank with the transferred fluid.

2. The device of claim 1, wherein the plurality of pressurized fluid sources comprises a plurality of pressurized fluid containers.

3. The device of claim 2, wherein several of said pressurized fluid containers comprise a second fluid outlet connected to a second respective outlet valve.

4. The device of claim 3, wherein each of the second outlet valves of the fluid containers is connected to the distribution terminals via the transfer ducts.

5. The device of claim 1, wherein the plurality of pressurized fluid sources comprises at least one compressor.

6. The device of claim 5, wherein:
each of several of said pressurized fluid sources comprises a second fluid outlet connected to a second respective outlet valve; and
the outlet of the compressor is connected parallel to the second fluid outlets of the pressurized fluid sources and also to the transfer ducts.

7. The device of claim 6, wherein
each of the second outlet valves of the pressurized fluid sources is connected to the distribution terminals via the transfer ducts.

8. The device of claim 1, wherein each distribution terminal comprises an isolation valve located downstream of the transfer ducts.

9. The device of claim 1, wherein the device is adapted and configured for filling pressurized gaseous hydrogen tanks for vehicles.

10. A method for filling a tank using a filling device of claim 1, comprising the steps of:
detecting a faulty one of the first outlet valves or a faulty one of said at least one isolation valve in the fluid transfer circuit;
transferring fluid via at least one second indirect alternative fluid path of the circuit that avoids said faulty valve; and
filling a pressurized gas tank with the transferred fluid.

11. The method of claim 10, wherein:

in the event of the detection of a fault in an isolation valve of a first transfer duct connected to a first distribution terminal; and the method further comprises transferring fluid from a source to said first distribution terminal and the pressurized gas tank via at least one second indirect alternative fluid path that passes through transfer ducts connected to another distribution terminal, then via a second transfer duct connected to the first distribution terminal.

12. The method of claim 10, wherein:

the plurality of pressurized fluid sources comprise a second fluid outlet connected to a second respective outlet valve;

said second outlet valves of each of the fluid containers is connected to the distribution terminals via the parallel transfer ducts;

said method further comprises:
  transferring pressurized fluid from one of the pressurized fluid sources to a distribution terminal; and
  in the event of a detection of a fault in the first outlet valve of a respective one of the pressurized fluid sources, transferring pressurized fluid from the plurality of pressurized fluid sources to the distribution terminal via the second fluid outlet.

13. The method of claim 12, wherein:

the plurality of pressurized fluid sources comprises at least one compressor connected parallel to the second fluid outlets of the pressurized fluid sources and to the transfer ducts;

the method further comprises:
  filling one of the pressurized fluid sources being filled by the compressor; and
  in the event of the detection of a fault in the first outlet valve of said one pressurized fluid source being filled, filling said one pressurized fluid source being filled via the second fluid outlet.

* * * * *